(12) United States Patent
Merritt

(10) Patent No.: US 7,506,235 B2
(45) Date of Patent: Mar. 17, 2009

(54) ERROR CORRECTION APPARATUS AND METHOD

(75) Inventor: David Merritt, Sugar Hill, GA (US)

(73) Assignee: Wegener Communications, Duluth, GA (US)

( * ) Notice: Subject to any disclaimer, the term of this patent is extended or adjusted under 35 U.S.C. 154(b) by 370 days.

(21) Appl. No.: 11/249,780

(22) Filed: Oct. 13, 2005

(65) Prior Publication Data

US 2006/0085724 A1 Apr. 20, 2006

Related U.S. Application Data

(63) Continuation of application No. 10/448,710, filed on May 30, 2003.

(51) Int. Cl.
*H04L 1/16* (2006.01)
(52) U.S. Cl. .................................... 714/748
(58) Field of Classification Search ............. 714/748
See application file for complete search history.

(56) References Cited

U.S. PATENT DOCUMENTS

| | | | |
|---|---|---|---|
| 4,518,989 A | 5/1985 | Yabiki et al. | |
| 4,538,176 A | 8/1985 | Nakajima et al. | |
| 4,903,031 A | 2/1990 | Yamada | |
| 4,985,895 A | 1/1991 | Pelkey | |
| 5,019,910 A | 5/1991 | Filmer | |
| 5,029,232 A | 7/1991 | Nall | |
| 5,036,537 A | 7/1991 | Jeffers et al. | |
| 5,235,643 A | 8/1993 | Anderson et al. | |
| 5,404,505 A | 4/1995 | Levinson | |
| 5,550,576 A | 8/1996 | Klosterman | |
| 5,553,083 A * | 9/1996 | Miller ........................ 714/748 | |
| 5,594,490 A | 1/1997 | Dawson et al. | |
| 5,651,115 A | 7/1997 | Hasebe et al. | |
| 5,684,525 A | 11/1997 | Klosterman | |
| 5,727,002 A * | 3/1998 | Miller et al. ................ 714/748 |
| 5,754,754 A * | 5/1998 | Dudley et al. ................ 714/18 |
| 5,764,773 A | 6/1998 | Nishiura | |
| 5,815,662 A | 9/1998 | Ong | |
| 5,828,402 A | 10/1998 | Collings | |
| 5,828,945 A | 10/1998 | Klosterman | |
| 5,886,733 A | 3/1999 | Zdepski et al. | |
| 5,892,767 A | 4/1999 | Bell et al. | |
| 5,917,915 A | 6/1999 | Hirose | |
| 5,923,362 A | 7/1999 | Klosterman | |
| 5,973,723 A | 10/1999 | DeLuca | |
| 5,987,519 A | 11/1999 | Peifer et al. | |
| 6,040,850 A | 3/2000 | Un et al. | |

(Continued)

*Primary Examiner*—Stephen M. Baker
(74) *Attorney, Agent, or Firm*—Husch Blackwell Sanders, LLP; Robert C. Haldiman

(57) ABSTRACT

A system, method and data structure for error correction for use in the transmission of content data distribution networks uses a compressed memory, for example a bitmap, to identify portions of transmitted content data files where transmission errors have occurred. The error memory, is used to generate an error status report that is returned to a transmission controller via a low bandwidth back channel, for example the Internet. The information in multiple error status reports is aggregated by the control system of the transmitter and used to re-transmit those portions of previously transmitted content data files that were not properly received due to error. By re-transmitting only the data packets of the transmitted content data files that contain errors, overall transmission speed is increased and bandwidth usage is conserved.

22 Claims, 9 Drawing Sheets

| | | |
|---|---|---|
| 1 501 | File signature (md5 hash) | 128-bit (16-byte, msb-lsb) binary |
| 2 502 | Port Number | 1 - 65535 16-bit (2-byte, msb-lsb) binary |
| 3 503 | Single Block Number Missed | 32-bit (4-byte, msb-lsb) binary |
| 4 504 | First of Range of Block Numbers Missed | 32-bit (4-byte, msb-lsb) binary - must be followed by Member ID 5 |
| 5 505 | Last of Range of Block Numbers Missed | 32-bit (4-byte, msb-lsb) binary - must follow Member ID 4 |
| 6 506 | Byte-Offset into Bitmap of Blocks Missed | 32-bit (4-byte, msb-lsb) binary - must be followed by Member ID 7 |
| 7 507 | Length of Bitmap of Blocks Missed | 32-bit (4-byte, msb-lsb) binary - must follow Member ID 6 and be followed by Member ID 8 |
| 850 8 | Bitmap of Blocks Missed | binary string of bytes - must follow Member ID 7 |
| 509 9 | Total Number of Missed Blocks | 32-bit (4-byte, msb-lsb) binary |
| 10 510 | Error Code | 16-bit (2-byte, msb-lsb) binary - 0=no error |

U.S. PATENT DOCUMENTS

| | | | |
|---|---|---|---|
| 6,072,983 A | | 6/2000 | Klosterman |
| 6,115,749 A * | | 9/2000 | Golestani et al. ............ 709/235 |
| 6,230,163 B1 | | 5/2001 | Thijssen |
| 6,269,080 B1 * | | 7/2001 | Kumar ....................... 370/236 |
| 6,272,549 B1 | | 8/2001 | Daniel |
| 6,367,045 B1 * | | 4/2002 | Khan et al. ................. 714/748 |
| 6,378,129 B1 | | 4/2002 | Zetts |
| 6,392,993 B1 * | | 5/2002 | Hamilton et al. ............ 370/230 |
| 6,393,585 B1 | | 5/2002 | Houha et al. |
| 6,401,242 B1 | | 6/2002 | Eyer et al. |
| 6,415,329 B1 | | 7/2002 | Gelman et al. |
| 6,425,127 B1 | | 7/2002 | Bates et al. |
| 6,438,108 B1 * | | 8/2002 | Kanljung et al. ............ 370/249 |
| 6,510,454 B1 | | 1/2003 | Walukiewics |
| 6,574,668 B1 * | | 6/2003 | Gubbi et al. ................. 709/237 |
| 6,601,207 B1 | | 7/2003 | Vanttinen |
| 6,606,037 B2 * | | 8/2003 | Ekstrand et al. ............... 341/50 |
| 6,650,869 B2 * | | 11/2003 | Kelly et al. ................. 455/13.2 |
| 6,658,619 B1 * | | 12/2003 | Chen .......................... 714/748 |
| 6,772,215 B1 | | 8/2004 | Rathonyi et al. |
| 6,778,501 B1 * | | 8/2004 | Malmgren et al. .......... 370/236 |
| 6,859,449 B2 | | 2/2005 | Gronberg et al. |
| 2001/0043573 A1 | | 11/2001 | Kelly |
| 2001/0055305 A1 | | 12/2001 | Oz et al. |
| 2002/0007494 A1 | | 1/2002 | Hodge |
| 2002/0010936 A1 | | 1/2002 | Adam |
| 2002/0010938 A1 | | 1/2002 | Zhang et al. |
| 2002/0023143 A1 | | 2/2002 | Stephenson et al. |
| 2002/0026645 A1 | | 2/2002 | Son et al. |
| 2002/0034179 A1 | | 3/2002 | Ollikaninen et al. |
| 2002/0035730 A1 | | 3/2002 | Ollikaninen et al. |
| 2002/0047899 A1 | | 4/2002 | Son et al. |
| 2002/0059256 A1 | | 5/2002 | Halim et al. |
| 2002/0069295 A1 | | 6/2002 | Edwards et al. |
| 2002/0071434 A1 | | 6/2002 | Furukawa |
| 2002/0083441 A1 | | 6/2002 | Flickinger et al. |
| 2002/0095600 A1 | | 7/2002 | Deen et al. |
| 2002/0095676 A1 | | 7/2002 | Knee et al. |
| 2002/0104097 A1 | | 8/2002 | Jerding et al. |
| 2002/0105976 A1 | | 8/2002 | Kelly et al. |
| 2002/0108124 A1 | | 8/2002 | Sato |
| 2002/0108128 A1 | | 8/2002 | Lash et al. |
| 2002/0112076 A1 | | 8/2002 | Rueda et al. |
| 2002/0131428 A1 | | 9/2002 | Pecus et al. |
| 2002/0136218 A1 | | 9/2002 | Cardoso, Jr. |
| 2002/0144291 A1 | | 10/2002 | Smiley et al. |
| 2002/0150102 A1 | | 10/2002 | Janko et al. |
| 2002/0152467 A1 | | 10/2002 | Fiallos |
| 2002/0163935 A1 | | 11/2002 | Paatela et al. |
| 2002/0178360 A1 | | 11/2002 | Wenocur et al. |
| 2002/0184339 A1 | | 12/2002 | Mackintosh et al. |
| 2002/0184529 A1 | | 12/2002 | Foster et al. |
| 2002/0184642 A1 | | 12/2002 | Lude et al. |
| 2002/0191640 A1 | | 12/2002 | Haymes et al. |
| 2002/0194595 A1 | | 12/2002 | Miller et al. |
| 2002/0199001 A1 | | 12/2002 | Wenocur et al. |
| 2002/0199096 A1 | | 12/2002 | Wenocur et al. |
| 2003/0005444 A1 | | 1/2003 | Crinon et al. |
| 2003/0009694 A1 | | 1/2003 | Wenocur et al. |
| 2003/0009769 A1 | | 1/2003 | Hensgen et al. |
| 2003/0016664 A1 | | 1/2003 | McLampy et al. |
| 2003/0018912 A1 | | 1/2003 | Boyle et al. |
| 2004/0177121 A1 | | 9/2004 | Simyon et al. |

* cited by examiner

| pkstart | pkttype | fxid | dflnm | flsz | blksz | pktcrc | pktstop |
|---------|---------|------|-------|------|-------|--------|---------|
| 402 | 404 | 406 | 408 | 410 | 412 | 414 | 416 |

Fig. 6

| pkstart | pkttype | fxid | dbno | dblk | pktcrc | Pktstop |
|---------|---------|------|------|------|--------|---------|
| 418 | 420 | 422 | 424 | 426 | 428 | 430 |

Fig. 7

| pktstart | pkttype | fxid | dbno | fdbsz | fdblk | flsig | pktcrc | Pktstop |
|---|---|---|---|---|---|---|---|---|
| 432 | 434 | 436 | 438 | 440 | 442 | 444 | 446 | 448 |

Fig. 8

| | | |
|---|---|---|
| 1 501 | File signature (md5 hash) | 128-bit (16-byte, msb-lsb) binary. |
| 2 502 | Port Number | 1 - 65535 16-bit (2-byte, msb-lsb) binary |
| 3 503 | Single Block Number Missed | 32-bit (4-byte, msb-lsb) binary |
| 4 504 | First of Range of Block Numbers Missed | 32-bit (4-byte, msb-lsb) binary - must be followed by Member ID 5 |
| 5 505 | Last of Range of Block Numbers Missed | 32-bit (4-byte, msb-lsb) binary - must follow Member ID 4 |
| 6 506 | Byte-Offset into Bitmap of Blocks Missed | 32-bit (4-byte, msb-lsb) binary - must be followed by Member ID 7 |
| 7 507 | Length of Bitmap of Blocks Missed | 32-bit (4-byte, msb-lsb) binary - must follow Member ID 6 and be followed by Member ID 8 |
| 850 8 | Bitmap of Blocks Missed | binary string of bytes - must follow Member ID 7 |
| 509 9 | Total Number of Missed Blocks | 32-bit (4-byte, msb-lsb) binary |
| 10 510 | Error Code | 16-bit (2-byte, msb-lsb) binary - 0=no error |

Fig. 9

ERROR CORRECTION APPARATUS AND METHOD

CROSS-REFERENCE TO RELATED APPLICATIONS

This application is a continuation of U.S. patent application Ser. No. 10/448,710 filed on May 30, 2003, now U.S. Pat. No. 7,296,204.

BACKGROUND OF THE INVENTION

1. Field of the Invention

This invention is in the field of broadcast data networks, systems for receiving broadcast data 2. Related Art Error correction is an important component of any system for the distribution of content data such as music or video. Error correction is particularly important for systems distributing by satellite or terrestrial broadcast. The increased likelihood of transmission error due to factors such as the atmospheric conditions or damage to receiving equipment increases the importance of insuring complete transmission of content data.

Due to the large amount of data that needs to be transmitted for the distribution of content data such as video, audio and data, there is a continuing need in the art for an efficient use of bandwidth. Content data such as a TV program, advertisement or song are transmitted in files comprised of many packets. Transmission errors typically involve some, but not all data packets. Systems that rebroadcast entire content data files in response to transmission error use bandwidth inefficiently. Systems that broadcast error correction transmissions repeatedly are inefficient especially if the transmissions are not automatically limited in number. Common error correcting protocols request retransmission immediately upon detecting an error. This leads to continuous interruption by multiple error reports from multiple receivers and inefficient multiple separate re-transmissions responsive to each of them.

There is also a continuing need for speed due to inherent delays in transmissions by satellites. If the system sends multiple error correction packets, the time required for complete correction of all errors is increased. Shortening this time by minimizing and aggregating the number of error correction packets transmitted is desirable.

There is a need in the art for a system that transmits error corrections for only those packets that contained errors in the original broadcast. There is a need in the art for a system that aggregates all error corrections and retransmits them in small number of error correction transmissions, preferably only one. In order to achieve this goal, there is a need in the art for a system that identifies which data packets were received with errors in which individual receivers, aggregates the corrections necessary into a single error correction message and transmits the error correction in a minimal number of transmission.

Content Data Distribution Systems.

Most digital data distribution systems commonly work according to common familiar concepts. Multiple content data streams, video, audio or data, are divided into packets, multiplexed, transmitted, demultiplexed and routed for use to various receivers. The MPEG2 protocols are illustrative of the class, and characteristic of the embodiments discussed herein. Other protocols such as MPEG1 or DSS are alike in function although they vary in detail.

The Moving Picture Experts Group (MPEG) is the expert group of the International Organization for Standardization (ISO) that has defined the MPEG-2 standard protocol; a format that can be used to describe a coded video bitstream.

Video compression is an important part of the MPEG standards. Additionally, MPEG includes a family of standards involving different aspects of digital video and audio transmission and representation. The general MPEG-2 standard is currently divided into eight parts, including systems, video, audio, compliance, software simulation, digital storage media, real-time interface for system decoders, and DSM reference script format.

Video, audio, and other digital information must be multiplexed together to provide encoded bitstreams for delivery to the target destination. The Systems portion of the MPEG-2 standard (ISO/IEC 13818-1) defines how these bitstreams are synchronized and multiplexed together. Typically, video and audio data are encoded at respective video and audio encoders, and the resulting encoded video and audio data is input to an MPEG-2 Systems encoder/multiplexer. This Systems multiplexer can also receive other inputs, such as control and management information such as authorization identifiers, private data bitstreams, and time stamp information. The resulting coded, multiplexed signal is referred to as the MPEG-2 transport stream. Generally, a data transport stream is the format in which digital information is delivered via a network to a receiver for display.

The video portion of the MPEG-2 standard (ISO/IEC 13818-2) sets forth the manner in which pictures and frames are defined, how video data is compressed, various syntax elements, the video decoding process, and other information related to the format of a coded video bitstream. The audio portion of the MPEG-2 standard (ISO/IEC 13818-3) similarly describes the audio compression and coding techniques utilized in MPEG-2. The video and audio portions of the MPEG-2 standard therefore define the format with which audio or video information is represented. Any authorization control manipulation and any decryption must ultimately output data in this format for MPEG-2 applications.

The video and audio encoders provide encoded information to the Systems multiplexer in the form of an "elementary stream". These elementary streams are "packetized" into packetized bit streams which are comprised of many packets. Each packet includes a packet payload corresponding to the content data to be sent within the packet, and a packet header that includes information relating to the type, size, and other characteristics of the packet payload.

Bit stream packets from the video and audio encoders are mapped into transport stream packets at the Systems encoder/multiplexor. Each transport stream packet includes a payload portion and a transport stream packet header. The transport stream packet header provides information used to transport and deliver the information stream. Each transport packet header includes a packet identifier (PID) to identify the digital program or elementary stream to which it corresponds. Within the transport packet header is a packet identifier (PID), which is a 13-bit field used to identify transport packets which carry elementary stream data from the same elementary stream, and to define the type of payload in the transport packet payload.

Before the transport stream is decoded, the transport packets must undergo analysis, synchronization, demultiplexing, as well as other packet manipulating functions. These functions can be managed by devices such as a MPEG transport demultiplexor, in a known fashion.

After synchronization and demultiplexing, bit stream packets must be organized from the transport packets carrying them to output coherent content. Tables are used to do this.

Packet Identification (PID) tables are used to store the packets comprising a content data file in memory for later playback as a program.

SUMMARY OF THE INVENTION

It is in view of the above problems that the present invention was developed. The present invention is a system, method, apparatus and data structure configured in a computer readable medium for correcting errors in the transmission of content data files over distribution networks. A compressed memory is used to identify portions of transmitted content data files where transmission errors have occurred. The compressed memory, which may be in the form of a bitmap for example, is returned to a transmission uplink controller via a low bandwidth back channel, for example the Internet. The information in the compressed, transmitted memory is used by the uplink control system of the transmitter to re-transmit those portions of previously transmitted content data files that were not properly received due to error. Re-transmitting content data files originally received with errors insures the proper delivery of error free audio, video or data files. By re-transmitting only the portions, or packets, of the transmitted content data files that contain errors, system speed is increased and bandwidth usage is conserved.

The system of the present invention transmits content data files, comprised of multiple packets (or "blocks") of data according to known protocols, for example the MPEG protocols. Transmission is via a one-way, high speed transmission protocol known to those in the networking arts, such as UDP/IP. Terrestrial broadcast systems may use the present invention as well. Multiple receivers, for example cable television providers, receive the transmitted content data files. The individual receiver maintains a memory that is compressed and transmittable, for example a bitmap. Because the transmission protocols divide content data files into multiple packets or blocks, the memory may be compressed by assigning a bit within the memory to each of the transmitted packets. As it receives the transmission of a content file, each receiver marks a bit in the bitmap to indicate the proper receipt of the content data packet corresponding to that bit. If the data packet contains an error, or is not received, that fact will be indicated in the setting of the corresponding bit for that packet in the bitmap. A one or zero indicates an error free packet has been received, and the opposite indicates an error in receiving that packet. Upon completion of an original transmission of a content data file, the transmitter transmits a request for return of an error status report, which is a portion of a compressed memory, or bitmap. The error status report is returned from each individual receiver to the transmitter via a low bandwidth back channel. In the depicted embodiments, this is the Internet. Accordingly, the receivers encapsulate the bitmap in TCP/IP protocol for sending back to the transmitter. Using email for return paths is disclosed in U.S. patent application Ser. No. 10/384,423, which is incorporated by reference herein.

A control processor for the transmitter reads the received bitmaps and retransmits only those content data packets that the bitmap indicates were not safely received by the corresponding receiver.

The control processor for the uplink also aggregates the bitmaps for the various individual receivers. Each individual receiver may have varying errors due to local conditions such as rain, damage to equipment or power loss. The system of the present invention conserves bandwidth usage and promotes speed by initiating error correction only upon a signal from the transmitter, as opposed to receiving error messages from multiple servers in a piecemeal or repeating fashion initiated by the receivers. Speed is further promoted and bandwidth usage conserved by aggregating the required re-transmissions for all of the receivers into a single or minimal number of transmissions. Continuous loops are avoided by ending the re-transmission after a designated number of re-transmission attempts have been completed.

The compressed, transferable memory, or bitmap, and the message configuration used to return it to the transmitter are capable of indicating in an efficient manner errors in single packets or errors involving a range of packets.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 6 illustrates a file transmission control packet.

FIG. 7 illustrates a content data packet.

FIG. 8 illustrates a final content data file packet.

FIG. 9 illustrates an error status report.

DETAILED DESCRIPTION OF THE PREFERRED EMBODIMENTS

Figure 1:
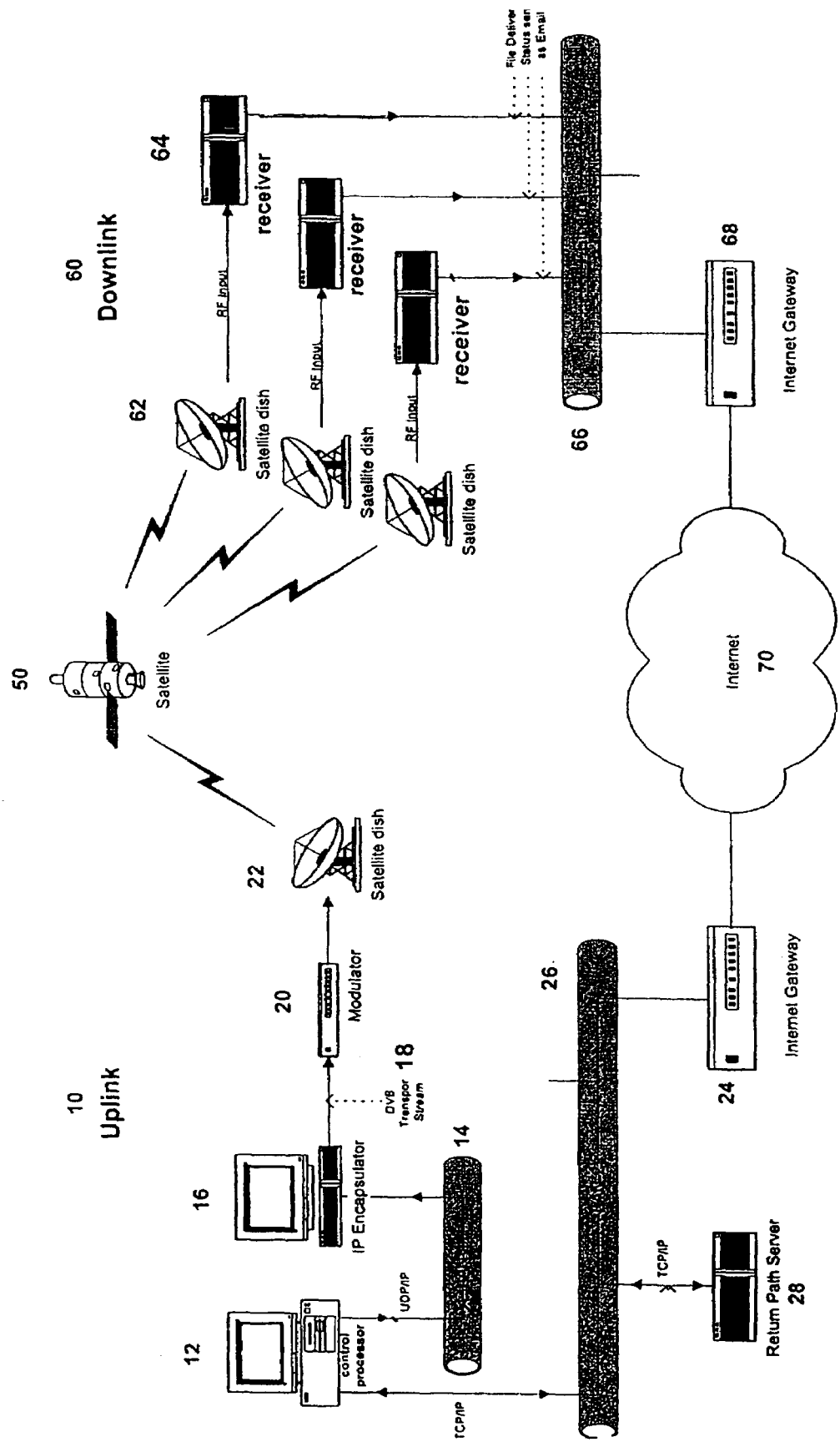
FIG. 1 is a block diagram of a satellite distribution system.

Referring now to the figures in which like reference numbers correspond to like elements, FIG. 1 is a block diagram of a satellite distribution network for content data such as audio, video, voice or data that incorporates the error correction method of the present invention. Content data such as audio or video is transmitted from an uplink 10 to a satellite 50 and re-transmitted to a plurality of downlinks 60. It is considered to be within the scope of the present invention that broadcasting may be by terrestrial means as well. Other distribution systems are within the scope of the present invention as well, including computer network, Internet, cable or fiber optic networks, particularly those characterized by higher bandwidth such as the Internet Multicast protocol, sometimes referred to as "M Routing" or "M Bone." However, in all of the embodiments depicted herein, broadcasting is via satellite.

The equipment comprising uplink 10 includes a control processor 12. Control processor 12 controls broadcast of any number of a variety of content data files. When a content data file is to be transmitted, it is communicated from the control processor 12 through a first large area network ("LAN") 14 to the uplink transmitting equipment. Uplink transmitting equipment includes an IP encapsulator which puts the content data file into a transmittable protocol. These protocols are known to those with skill in the art and may be used in combination with the present invention. The most commonly used and familiar protocols include the MPEG 1 audio and MPEG 2 audio video protocols. Encapsulator 16 produces a digital video (or audio) broadcasting transport stream 18. In the depicted embodiment this is a Digital Video Broadcast ("DVB") transport stream comprised of multiple data packets according to the MPEG2 protocol. The transport system of data packets is further configured for high bandwidth, one way transmission according to known protocols such as UDP/IP, which are compatible with DVB. This is modulated at a modulator 20 for transmission via satellite dish 22 to satellite 50.

The equipment comprising the downlink 60 includes a satellite dish 62 for receiving a broadcast transmission of content data files. The radio frequency signal containing the DVB transport stream is received by a decoder/receiver ("receiver") 64. The system may incorporate as few as one satellite dish and receiver downlink 60, but in practical reality a plurality of downlinks receive the broadcast transmissions. The Receivers 64 are in operative communication with an ethernet 66 having an internet gateway 68. Receiver 64 will use this gateway 68 to return communication regarding the success of downloading of the broadcast content data files.

At the uplink 10 a second Internet gateway 24 receives file status messages via the Internet 70. Through a second LAN 26 status report e-mails are delivered to a return path server 28. The return path server 28 thereafter communicates the file delivery status information to the control processor 12. Using the information contained in the file delivery status e-mail, the control processor 12 will command resending of packets of content data not yet successfully delivered.

Figure 2:
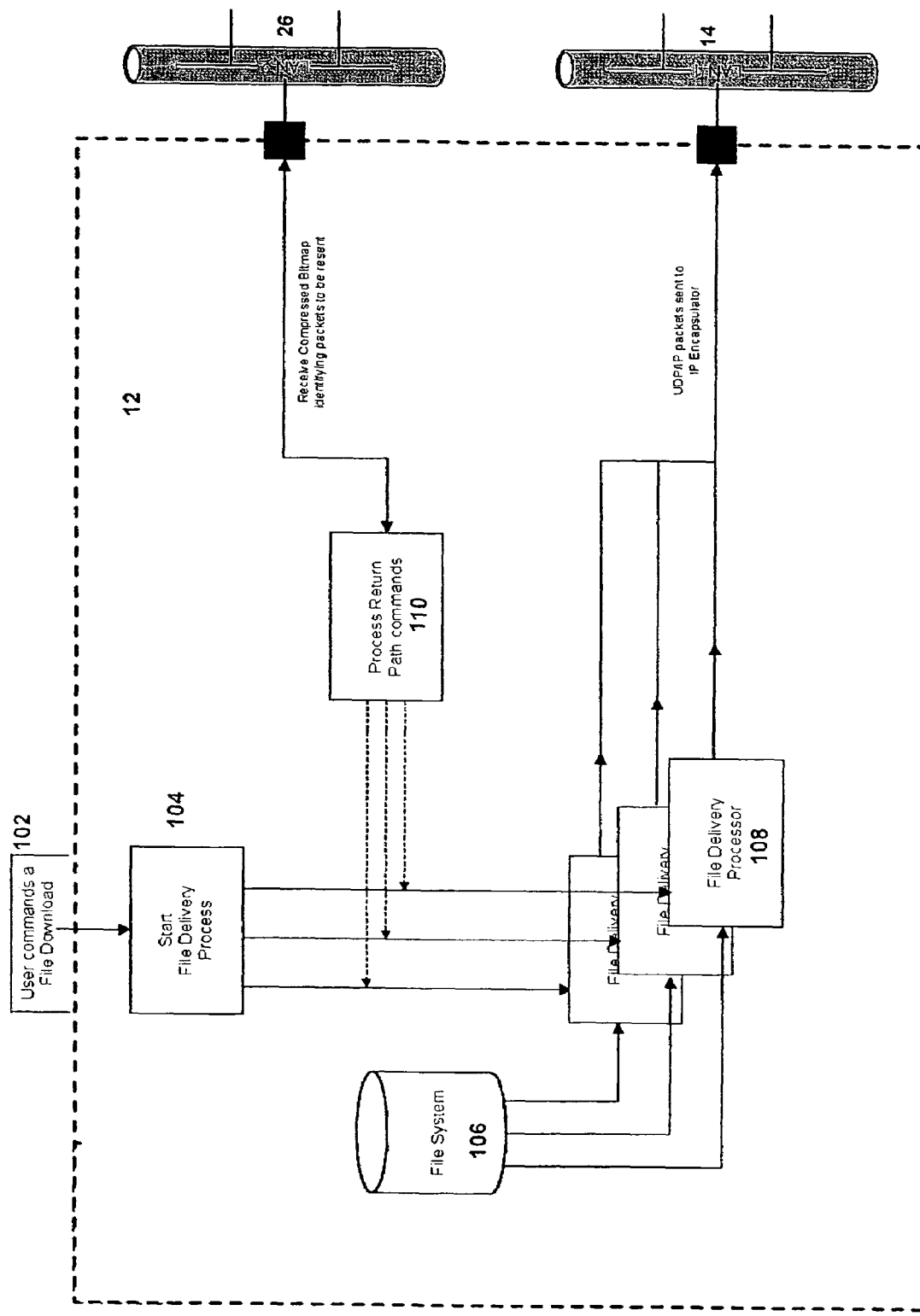
FIG. 2 is a block diagram of a transmission uplink controller.

FIG. 2 depicts the file transmission control components within the control processor 12. The control processor 12 is in operative communication with an operator interface 102. When a user commands 102 that a content data file be transmitted, a start file delivery routine 104 is initiated. A file system 106 contains multiple content data files. The user selected file is retrieved from the file system 106 and forwarded to a file delivery processor 108 where it is processed into data packets again according to protocol, such as the UDP/IP transmission protocol known to those with skill in the art. The packets are forwarded to first LAN 14 for the processing and transmission.

The control processor 12 also contains a processor for receiving file delivery status information from a second LAN 26. Return path processor 110 controls the file delivery processor 108 to resend those packets of content data that were not received, or received in error.

Figure 3:
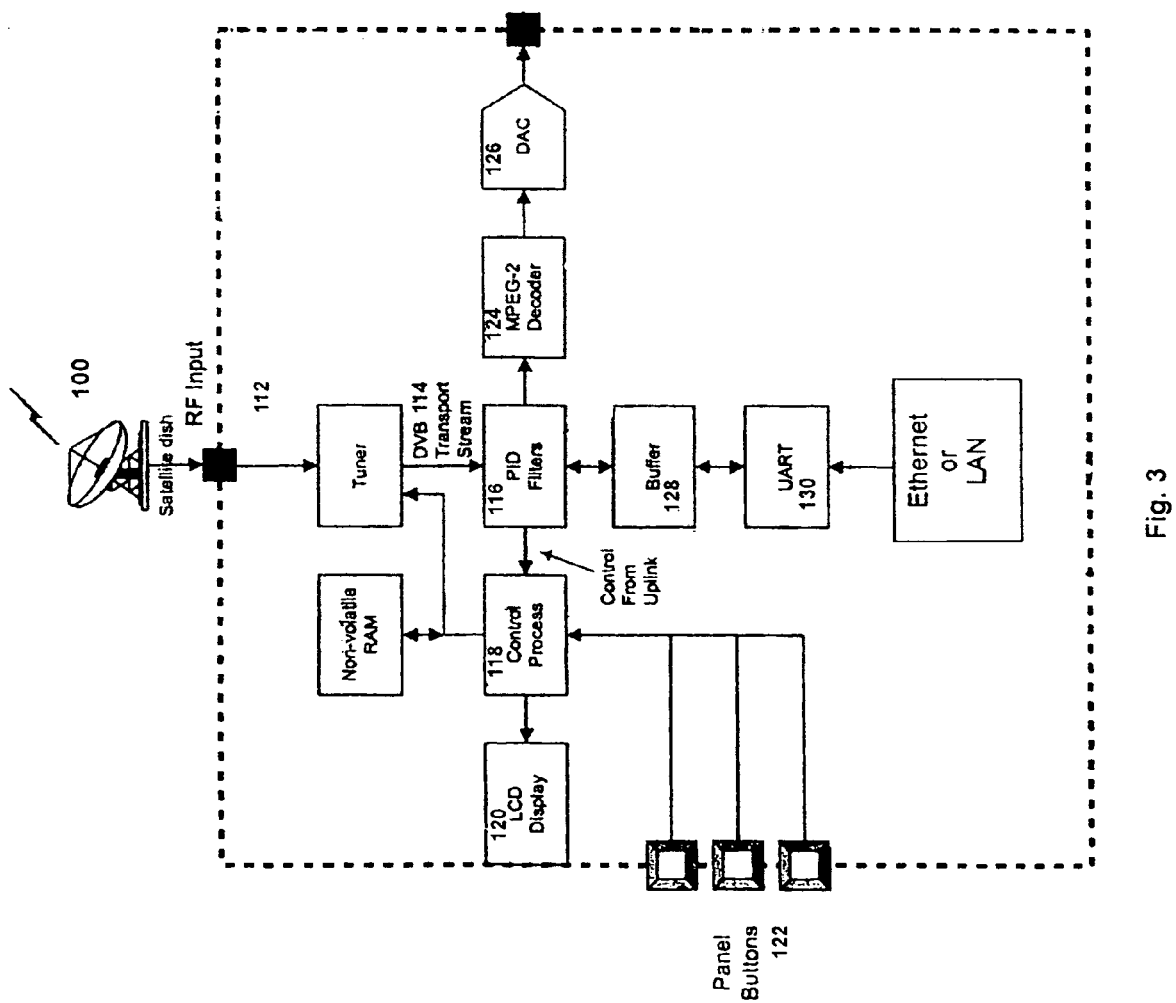
FIG. 3 is a block diagram of a satellite broadcast receiver/decoder.

FIG. 3 is a block diagram illustrating the general configuration of a receiver and decoder. Remote equipment 60 includes a satellite dish for receiving the broadcast signal, 62. Multiple channels connect the satellite dish 62 with tuner 112 for receipt of one or more streams of data through radio frequency input. From tuner 112 digital video bus 114 allows transfer of data to packet identification filter processor 116.

Packets containing control instructions may be forwarded to control processor 118. Control processor 118 may be interactive with a user through an LCD display 120 and panel buttons 122. Content, for example music, packets are received by an MPEG 2 decoder 124. After decoding, content data is forwarded to digital analog converter 126 where it is output for play.

Packets are also forwarded to buffer 128 and there through interconnected with a synchronous transfer mode reassembler UART 130. From there an ethernet or LAN connection is available.

Figure 4:
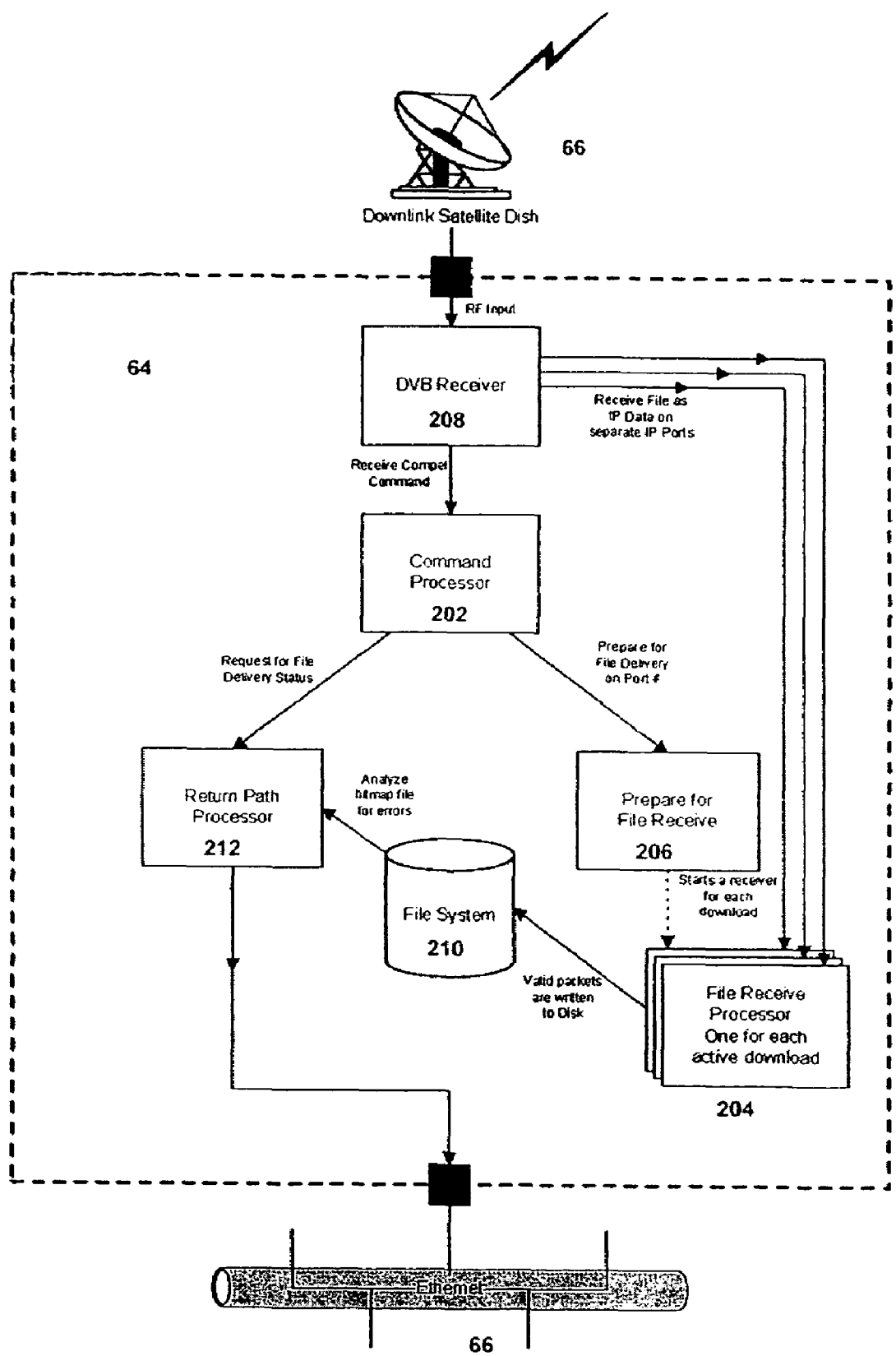
FIG. 4 is a block diagram of receiver components required for error correction.

FIG. 4 depicts the components of the downlink receivers used for error correction. The downlink satellite dish 62 forwards content data files as a radio frequency input to the receiver 64. The first transmitted item is a control processor command to initialize the receiving processing. This is passed through to a command processor 202 and forwarded to the file receiving processor 204 to designate a port for the transmission of the particular content data file 206. Thereafter content data files are received by a DVB receiver 208 where they are de-multiplexed and forwarded as IP data files to the file receive processor 204. Once received and filed for storage by the file receive processor 204, files are stored in the file system 210. Each file is comprised of a plurality of data packets. The file receive processor 204 checks each packet for its integrity. This check is by any known means, for example, a checksum transmitted with each packet. The packets are stored in the file system 210. Invalid packets, being packets with errors or packets that are not received, are not stored.

The file receive processor also generates a short term memory to be used for generating an error correction message for return to the uplink. The memory has a plurality of settings. Each setting corresponds to a content data file packet. Invalid packets or missing blocks will have their corresponding setting marked. In the depicted embodiments, this short term memory is a bitmap. Although other configurations of memories are considered to be within the scope of the present invention, in the depicted embodiments each bit of a bitmap corresponds to one of the data packets comprising the content data files.

At the uplink, when the controller receives a user input request to transmit a particular content data file, a short term memory—a bitmap—is configured at the uplink. Each bit in the bitmap corresponds to one of the data packets in the content data file to be transmitted. Because the content data files may be comprised of a few data packets, on the order of 10, or large files may be comprised of many thousands of data packets, the bitmaps likewise will be configured to be any size. Once a short term central memory space in the uplink has been configured and prepared, a command to receivers to prepare for transmission will be configured to contain the information indicating the size of the bitmap for that content data file. When the command to initialize for receiving is transmitted, the receivers receive the command, which includes the information indicating the properly configured bitmap size. In accordance with the command, the receiver likewise establishes a short term memory space; a receiver bitmap which is the same size as that in the uplink controller.

The receiver bitmap is marked as described below as the content data file packets are received. After all of the packets have been transmitted and received, the bitmap is marked as described below and forwarded to the return path processor 212. Upon completion of a timeout, or upon receipt of a signal from the uplink, the return path processor 212 routes an error status report encapsulated as an e-mail through ethernet 66 and on to the internet with an address directed to the uplink 10. The error status report contains the information stored in the receiver bitmap, and when received the report is used at the uplink to enter that information in the uplink bitmap.

Figure 5:
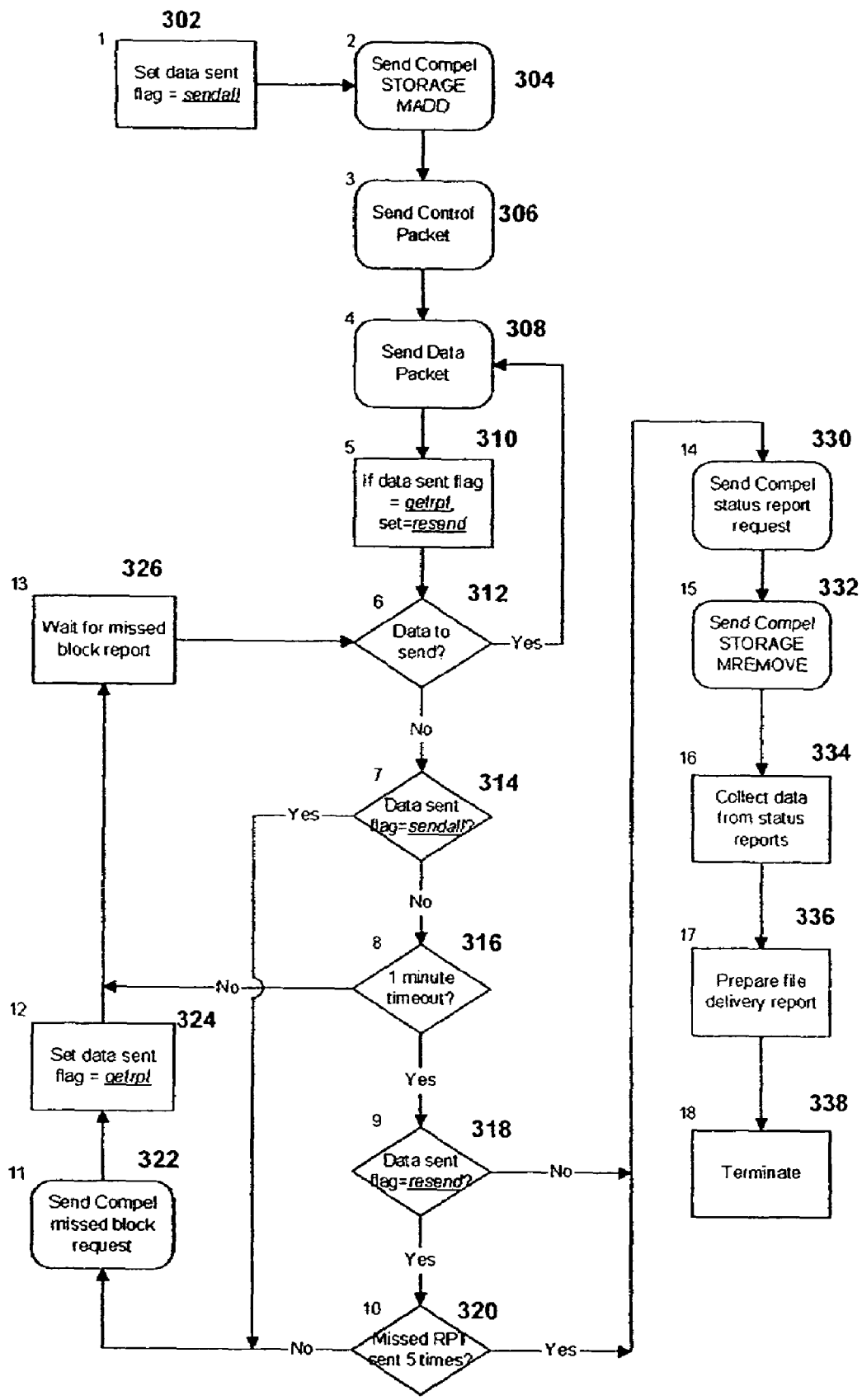
FIG. 5 is a flow chart illustrating the error correction method.

FIG. 5 is a flowchart depicting the present invention. At the uplink, the control processor 12 begins the content data file delivery process with a transmitted command instructing the receivers 64 to prepare for receipt of a transmission and to an assign a port. This instruction 304 will be followed by transmission of the content data file. Either this initialization command or a control data packet (see below) will identify an email or other network return path that the receiver processor will store and later use to return an error status report to the transmitting uplink controller.

As is known in the art, the transmission of content data file according to the known protocols includes transmission of multiple packets. The first packet is a control packet containing header information detailed below. Thereafter content data payload packets follow. After the command to receive information has been transmitted at step 304 the control packet is transmitted at step 306, followed by the data packets at step 308.

Throughout the transmission, the uplink control processor 12 maintains a status flag. The status indicated by this status flag reflects the steps of original transmission, "sendall", error reporting, "get report" and error correction "resend". Upon receipt of a user command to transmit a content data file, this status flag is set to a value indicating that the original transmission is in progress. The flag is maintained at this setting until the entire original file is sent. Flag settings corresponding to process steps are arbitrary, for example −1, 0 and 1.

Content data packets are queued for decrementing so that as each in turn is sent at step 308, they decrement to 0. As long as there are more packets in the queue at the uplink, the status flag at 310 will read "sendall", and the decision box at step 312 will loop back to send a next data packet at step 308. When the entire original file has been sent, (step 312 is "No"), the status flag is checked.

After an original transmission of a content data file is complete, the status flag will still be set at "sendall". Accordingly, at decision block 314, a recognition that the data sent status flag is still set to sendall after there is no more data to send (step 312) causes the method to progress to step 322. Step 322 is a signal sent by the uplink control processor via broadcast to all receivers to send their error status report or "missing block" requests that will contain the error report. At this time the uplink control processor also resets the status flag to "get report" 324. Thereafter the missed block or error status reports are sent by the receivers to the uplink and received by the control processor there 326.

If there are no errors, there will be no data to send at decision block 312. Accordingly, at decision block 314, the status flag will not be set to sendall (see step 324, described below) and a one minute time out will be observed. If the time out has not completed, the control processor at the uplink will continue to wait for "missing blocks", error status reports 326. If the one minute time out at decision block 316 has completed, status flag will be checked again. If there have been no errors, it will not be set to resend, and decision block 318 will direct the process towards termination block 330 (et seq.) because there had been no errors. (The duration of the time out is arbitrary and configurable.)

Conversely, if there had been errors in the original transmission, after there is no more original data to send at decision block 312 and the data sent flag is still set to "sendall" at 314, the send error status report request will be sent at 322. At this point the data sent flag is reset to "get report" at 324 ("get rpt") and, after the uplink control processor has waited to receive the error status report 326, there will be data to send 312. The data is then sent, at 308. In addition to retransmitting the packets corresponding to those originally received with errors, the status flag is again reset, this time from "get report" to "resend" 310. Once again, packets for resend are queued and incremented until decision block 312 determines that they have all been sent. Thereafter, decision block 314 will perceive that the status flag is not set to "sendall" and the 1-minute time out will be observed 316. Until the 1 minute time out has completed, the uplink control processor will continue to wait for error status reports and resend packets in response to it. After the 1 minute time out 316 the status flag is again checked. If there have been errors, the status flag has been set to "resend." When decision block 318 sees that the status flag has been set to "resend", it proceeds to resend the error correction and retransmission a finite number of times. Accordingly, decision block 320 asks if the correction packets have been retransmitted that reconfigurable number of times, which in the depicted embodiment is 5 times. This procedure iterates an error correction cycle a configurable number of times in order to prevent continuous loops of retransmissions and re-reporting of packets received in error when an error cannot be corrected by retransmission, thus avoiding continuous loops that achieve nothing and waste bandwidth. If the error correction packet has been retransmitted less the reconfigured number of times, 320, the uplink control processor re-requests and error status report 322, waits 326, and retransmits it at 308. If the error correction report has been sent the required number of times, decision block 320 directs the process to termination procedures.

Because it is an objective of the present invention to conserve bandwidth, the presently depicted system controls the timing for the return of an error message. The system also controls the number of times an error correction transmission is sent. Either or preferably both of these steps minimize the number of transmissions necessary to complete error correction by eliminating piecemeal error reports and continuing repeat loops of error reports.

Termination is done by sending another status report request 330. Thereafter the command is sent to release the port being used and reset the receiver controller to a ready status, 332. In the depicted embodiment, the process takes advantage of the option of restoring data for getting the successive transmissions and for indicating to the user that some steps need to be taken for an error that cannot be corrected by the retransmission of error packets. Accordingly, in step 334 the final status reports (step 330) are reviewed and their data collected. A final, augmented or separate report may be generated and sent including statistical information, for example error rates or totals. A delivery report is prepared 336 and operators alerted if a transmission contains an error that cannot be corrected by retransmission of the error packets. The type of error can be indicated with an error type code. Thereafter, the process terminates 338.

E-Mailing

While returning a report such as an error status report may be through any network amenable to sending it, in the depicted embodiments, Internet e-mail is used. As depicted above, a LAN or WAN connects the receivers and uplink controller with the Internet through the required servers and routers. The e-mails may use the Standard Mail Transfer Protocol (SMTP). At the uplink controller, the method spools email messages, as is known in the art, to queue the multiple email messages from multiple receivers. Later processing will aggregate the data from all reports, as described below.

The email address of the uplink controller is stored in the receivers in NVRAM or elsewhere after it has been transmitted in the initialization command or in the control data packet as part of the file transmission. Alternatively, it may be separately entered, for example manually.

It is considered to be within the scope of the present invention that email data transfer, requests for transfer and requests for further transfer of additional data may be maintained between the uplink controller and receivers. Accordingly, the uplink controller may store email addresses for the receivers or may receive them from the receivers. In this way, errors of certain types may be followed up upon if additional data or combinations of reports enable correction of them.

The error status report may be embodied in the email itself, or may be an attachment. Because email messages must be text based and not binary information, the status information may be encoded before it is attached to the email message. In one method, the receiver encodes the report using a UUencode/UUdecode algorithm; however, other encoding algorithms, such as MIME-64, may be used. UUencode is a software utility that converts a binary file to an ASCII file so that it can be sent as an attachment to an email message. When the message is received, the uplink controller runs UUdecode to convert it to the original file. Similarly, MIME-64 is an encoding algorithm, described in Internet Engineering Task Force RFC1341, herein incorporated by reference. RFC1341 was written by N. Borenstein and N. Freed and published in June 1992. MIME-64 has one advantage over Uuencode/Uudecode in that it allows for the conversion of larger messages.

After encoding, the text file may be attached to the reply email. The email server receives the reply email and status information. Optionally, the email server may extract the binary information, and generates a human readable file, such as an Hyper Text Markup Language (HTML) file.

In the depicted embodiments, the uplink controller will analyze extracted binary information, as described below. The analysis could be carried out either through software or hardware programming.

Content Data Files

FIG. 6 is a representation of a content data file control packet. A first portion 402 is a byte for a packet start character "pkstart" A second portion 404 is a byte for a packet type character "pkttpe." A third portion 406 is 2 bytes for a file transfer identification "fxid." A fourth portion 408 is an 80 byte destination file name "dflnm." A fifth portion 410 is an 8 byte file size indicator "flsz." A sixth portion 412 is a 2 byte data block size "blksz." A seventh portion 414 is a 2 byte control packet Cyclic Redundancy Check ("pktCRC"). The last portion 416 is a 1 byte packet stop character "pktstop."

FIG. 7 is a representation of a typical data packet. A first portion 418 is a 1 byte packet start character "pkstart." A next portion 420 is a 1 byte packet type character "pkttype." A third portion 422 is a 2 byte file transfer identification "fxid." A fourth portion 424 is an 8 byte data block number "dbno." A fifth portion 426 is the actual content data and is a configurable size "dblk." Accordingly, the fifth portion is a number of bytes corresponding to the pre-configured block size. A sixth portion 428 is a 2 byte data packet "pktCRC". A last portion 430 is a 1 byte packet stop character "pktstop."

FIG. 8 is a representation of a final data packet. A first portion 432 is a 1 byte packet start character. A second portion 434 is a 1 byte packet type character. A third portion 436 is a 2 byte file transfer identification. A fourth portion 438 is an 8 byte data block number. A fifth portion 440 is a 2 byte final data block size. A sixth portion 442 is a configurable number of bytes corresponding to the final bytes of content data. A seventh portion 444 is a 16 byte file signature. A eighth potion 446 is a 2 byte data packet CRC. And a final portion 448 is a 1 byte packet stop character.

"Error" and "received in error" as used herein mean that a packet was not received, or that it was received in a form that is not useable, or that it was received in a sub-optimal form that a user or administrator has configured the system to reject. In the depicted embodiments, a CRC checks the integrity of each packet upon receipt. A content data file CRC may be used. Any check method and any configuration of error criteria may be used with the present error correction apparatus and method.

FIG. 9 is a representation of an error status report, sometimes known as a "missing block" report. (A "block" is a data packet and it is "missing" if it is unavailable for use due to transmission error.) In the depicted embodiments, bitmaps are used for the short term memories in the uplink controller and in the receivers that record the existence and location of transmission errors. It is considered to be within the scope the present invention that any memory storing data that identifies packets or blocks within transferred files that were not received or that contained errors may be used as a part of the present error correction apparatus and method. Although any memory may be used, it is preferred to use a nonvolatile memory, as by saving on disc, so that a problem like power loss that is causing a transmission error does not also lose the record of that error. It is preferred that the short term memory used to generate an error status report be compressed, in the sense that it comprises a smaller volume of data than the originally transmitted file. Although designated herein as "short term" memory, as opposed to the intended long term memory of the content data file properly received, the error memory may also be saved beyond its use for error correction re-transmission, as a user chooses.

For transfer to the uplink, the information will be further compressed in an error status report. With the bitmap used in the depicted embodiments, each bit corresponds to one of the packets of content data in the transmitted content data file. When the uplink controller is instructed to transmit a content data file selected for transmission, it scales the short term central memory bitmap so that the bitmap has a number of bits equal to the number of data packets that comprise the content data file. The initialization command sent to the receivers likewise configures and scales the short term receiver memory bitmap to be the same size. By identifying the uplink bitmap in the uplink controller and the receiver bitmap in the receiver as corresponding to a particular content data file and scaling the bitmap to have a number of bits equal to the number of data packets in the file, the bits are effectively numbered, uniquely, so that their offset may serve to identify their number. The corresponding data packet will expressly contain the number, per se.

FIG. 9 is a table representing the error status report. In FIG. 9 a first portion 501 is a 16 byte file signature. A second portion 502 is a 2 byte designation of the port into which the content data file transmission was received. A third portion 503 is a 4 byte indicator of a single missed block or packet. A fourth portion 504 is a 4 byte indicator of the first bit of a range of packet numbers containing errors. A fifth portion 505 is a 4 byte indicator of a last bit in a range of packet numbers containing errors. The sixth portion 506 is a byte offset for indicating a byte with miscellaneous errors that are to be reported by sending a bitmap of that byte. A seventh portion 507 is a 4 byte indicator of the length of the bitmap of missed blocks. An eighth portion 508 is the actual bitmap of the miscellaneous missed blocks. A ninth portion 509 is 4 byte indicator of the total number of missed blocks. A last portion 510 is a 2 byte error code.

The error status report depicted in FIG. 9 is used for two kinds of reports. The first is an error status report and the second is a final statistical report. The status reports include portions, also called members or fields. The error status report includes portions, 1, 2, 3-8 and 10. The final statistical report uses members 1, 2, 9 and 10.

The error status report depicted herein is one of a plurality of status and data reports configured to be transferred by email or otherwise over a network to the uplink controller. Various reports are identified by a "group" number. Both the uplink controller and receivers store group "maps" that are configured to recognize "members" of the group. When a email is read, the group number is read first, the corresponding map called from memory and used to read the data in the email into memory in the previously configured format. For example, a simple group may be a receiver status report. The members may be a serial number, a software version and a control status. Each of the three members have an assigned space of an appropriate size for writing into a like formatted memory the particular serial number, software version and control status (off or on) of that receiver.

While it is considered to be within the scope of the present invention to transmit the receiver bitmap with its recordation of errors as the error status report, such a bitmap itself might be quite long. Speeds can be further increased and bandwidth usage further decreased by generating a status report of the contents of the bitmap. Accordingly, the error status report will have an error status report group number, which identifies a map of member data fields. When an error status report is to be generated, the receiver bitmap is read by the report generating routine in the receiver processor. The bitmap is read one section at a time. In the depicted embodiment the read sections are one byte long. The report will be configured according to the map for that group with members containing the relevant data in the form described below, so as to achieve compression. According to a proprietary email return path protocol as detailed in U.S. patent application Ser. No. 10/384,423, incorporated by reference herein, the error status report will be encapsulated in TCP/IP format for email transfer to the uplink controller when completed. It is considered to be within the scope of the present error correction apparatus and method to send any report including the data stored in the short term memory, via email or otherwise.

The report depicted in FIG. 9 is generated according to the following rules. If a byte contains an indication of a single error, indicated by a single bit being turned on (or off), a designated member in the report group, which is member number 3, 503 in the depicted embodiment, will be used to report that error by recording the unique number for the error bit. The second rule is that if an entire byte indicates errors in all of its corresponding blocks, that is if all the bits in that byte are on (or off), group members 4, 504 and 5, 505 will be used to communicate a range of bytes containing errors. If a large range of blocks have been missed, due to an error such as a loss of power at an individual receiver, that information is compressed and space conserved by communicating the beginning of the range in member number 4 and the end of the range in member number 5. The third rule uses members numbered 6, 7, and 8; 506, 507 and 508 respectively. On those occasions where a byte contains more than one but fewer than eight errors, the actual bitmap of that byte will be sent. Member 6 is used to identify the byte in question according to a byte offset. The byte offset is the number of bytes into the bitmap that the byte in question is found. Member number 7 indicates the length of the transferred bitmap portions, in terms of bytes. For example if 3 bytes are to be sent by bitmap, member number 7 will indicate 3. Member number 8 will contain the actual bitmap of those bytes. It will be apparent to those of skill in the art that a read section may be any length, for example 16 bits, but an 8 bit byte is preferred.

The data in the member fields may be rendered in binary or hexidecimal form. ASCII is possible, but not preferred.

When read by the uplink controller, once the group number calls up the error status report map, members will be known upon reading by a member ID number. Accordingly, the error status report may repeat a member any number of times, and may put members three through eight in any order.

It is considered to be within the scope of the present invention to compress data recording the error status with any compression techniques, including without limitation run length encoding, Huffman coding, wavelet based compression, LZW, or assigning symbols to groups or ranges of errors. The present invention returns any compressed error status report to an uplink according to the other steps of the methods disclosed herein.

EXAMPLE

By way of example, if the content data file to be transmitted includes 100 packets (or "blocks"), when the uplink controller receives a command to transmit that file, it will configure and store a bitmap 100 bits long. Each bit will correspond to one of the packets to be transmitted. The bitmap will be further configured of 13 bytes. When the uplink sends the command to initialize and prepare for transmission, it will include an instruction to a receiver control processor to also generate a bitmap that is the same size. Each receiver will create and configure a bitmap that is 100 bits long, in 13 bytes. The last byte will have only 4 bits. Accordingly, both receiver and uplink transmitter will contain the following bitmap: 00000000 00000000 00000000 00000000 00000000 00000000 00000000 00000000 00000000 00000000 00000000 00000000 0000.

If errors occur in the receipt of particular blocks, the corresponding bits will be turned on (or off) and the transmission proceeds. As an example, assume that packets containing errors include packets number 10, 17, 19 20, 27 through 34 and 60 through 82. When transmission of the original file is complete the receiver bitmap will be as follows: 00000000 0100000 10110000 00111111 11000000 00000000 00000000 00011111 11111111 11111111 11000000 00000000 0000.

In generating the error status report, the receiver processor reads the bitmap one read section, or byte, at a time. The receiver control processor reads the first byte. It contains no errors. Therefore, no data is entered for the errorless first byte in the error status report. The control processor proceeds to the next byte, and reads it. It contains one bit corresponding to an error in packet number 10. All the bits are numbered in sequence, 1-100. Obviously for large content data files the sequential numbering can proceed into the many thousands. Because the second byte contains only a single error, member number 3 in the error status report is used. The sequential number for the bit corresponding to the packet containing the error is entered into member number 3. Accordingly, member number 3, using a 4 byte space, records the number of bit number 10. For subsequent bitmap bytes containing single errors, member number 3 will be repeated with the next corresponding number.

The receiver control processor reads the next byte. If that byte contains more than one error but less than eight errors, the bitmap of that byte will be transmitted according to the third rule. (If a different size read section is used, a bitmap is sent under the third rule if there are more than one but less than total errors, whatever the total number of bits in the read section may be.) Member number 6 in the error status report is used to identify the position of the byte for which the bitmap will be sent. It is the second byte, (the first byte being designated zero). Accordingly, member number 6 in the error status report uses a 4 byte record to show that the "offset" of the byte in question is one. Member number 7 must be used in conjunction with member number 6. It indicates the length of the bitmap to be transmitted. In the present example, a single byte contains the three errors in question. Accordingly, member number 7 will record the numeral 1 for a bitmap transmittal 1 byte in length. Member number 8 is used to transmit the actual bitmap containing the errors in question. Member number 8 may be as long as necessary to transmit the bitmap. In this case, it will be one byte long and the bytes will read 10110000.

The receiver processor reads the next byte. It contains more than one but less than eight errors. In fact the errors contained in the third byte are the beginning of a range that extends into the fourth byte. However, the range is not long enough to include all 8 bits in any single byte. Accordingly, the third rule is still used and a bitmap sent. Member number 6 will indicate that the offset for the beginning of the bitmap to be transmitted to report these errors will be 2 because the bitmap begins in the third byte offset. Member number 7 is used to indicate that the length of the bitmap will be 2 bytes long. Member number 7 will read "2". Member number 8 will transmit the actual bitmap which will be 00111111 11000000.

The receiver processor will continue to read the short term memory bitmap one byte at a time. Bytes containing no errors will not generate any data to be reproduced into the error status report. Eventually, the receiver control processor will reach the range for the errors in blocks 60 through 84. Because the block in which the range begins has more than one error but less than eight errors, it will be reported using member 6, 7, and 8, as described above. That is, the offset will be seven the length will be one and the bitmap will read 00011111. When the receivers' control processor reads the next byte, all 8 bits will be on indicating 8 errors. Accordingly, members 4 and 5 will be used to report the range of errors. Member number 4 will identify a first bit in the range according to the sequential bit number, in this case 65. Having invoked the use of the second rule and the fourth member to indicate the beginning of a range, the receiver processor will read the next byte, and see that it too contains 8 errors and is totally on (or off). The receiver processor will read the next byte and see that it contains more than one but less than eight errors. Accordingly, member number 5 may now be used to enter the sequential bit number ending the last byte in the range of bytes that contain all errors. That is, sequential byte number 80 will be entered in member number 5, indicating the end of the range of bytes containing all errors. The end of the range extends into the next byte. For this byte third rule is invoked and members 6, 7, and 8 are used again. They will read, 10, 1 and 11000000.

The second rule—using members 4 and 5 to report the beginning and end of a range—obviate the need to send either a bitmap or a bit numbers for a range that may be thousands of bytes long. When the range is shorter than one byte, the space required to send a beginning and ending range bit number would be approximately equivalent to simply sending the bitmap itself.

The order of members in the error status report for this example will be 1, 2, 3, 6-7-8, 6-7-8, 4-5, 6-7-8, 10. Because a variety of bitmaps were sent, the 6-7-8 member rule was invoked three times. Where appropriate, members 3 and 4-5 may also be repeated. Each member of the compression data structure may be expressed in a field. An additional, separate or final field may include statistical information, as described below.

Final Statistical Reports

The report format depicted in FIG. 9 may also be used to report additional information for data compilation or forwarding to a user. "Members," i.e., fields, 1, 2, 9 and 10 are available for reporting information such as carrier information, frequency, data rates, total missed blocks 509 (member 9), etc. Member 1, 501 identifies the file and member 2, 502, identifies the receiver port to which it was sent. An error code field 510 (member 10) may be used to send an error code, which is configurable to convey any of a number of different types of errors that may require action on the part of a user to correct or otherwise respond to. In FIG. 5 the receivers send these final status reports 334 in response to an uplink request for them 330, and the uplink controller processes, stores and/or forwards the information in them 336.

Aggregation

The error status report described above is generated by each receiver individually. After the original content data file transmission is complete, the uplink controller sends a signal requesting return of all the error status reports from all of the receivers. Retransmitting error corrections for each receiver individually would consume time and bandwidth. The present error correction system conserves both by aggregating the multiple reported errors into a comprehensive error bitmap at the uplink. The bitmap originally configured and saved at the uplink is used to store the missed block data for all of the receivers. Then an error correction transmission is sent to all receivers. The error correction transmission includes all the packets missed by any of the receivers. A receiver that receives a packet in the error correction transmission that it does not need simply ignores that packet and continues to ignore packets retransmitted in response to other receivers error status reports until it receives the needed packet it requested in its own error status report, which it then saves. The system iterates five times.

Uplink aggregation proceeds as follows. When the uplink sends a content data file to the receivers, a unique File ID is generated for each active file download. The uplink controller and receivers use this File ID to associate the active download with the bitmap. This allows them to keep track of multiple and concurrent file downloads. When the receivers report missing blocks (packets), they report them to the uplink controller (with the associated File ID).

The uplink controller receives all of the error status reports and puts them in a queue. Then it reads the first one and changes the appropriate bits in the bitmap to reflect which blocks need to be resent for that receiver. Then the next error status report is read and those bits are entered into the uplink bitmap. After all of the receiver error status reports in the queue have been read and entered in the uplink bitmap, that bitmap records all of the missed packets that are still needed by at least one of the receivers. Only after the uplink bitmap so records all of the packets that need to be transmitted is the error correction transmission sent. This single re-transmission achieves the necessary error correction with a minimal use of time and bandwidth.

The system iterates a configurable number of times. In most cases the error status reports sent back after a first retransmission will reflect the correction of many, but not all of the errors. The uplink bitmap is cleared at the beginning of each send or resend cycle. A second set of error status reports is entered in the uplink bitmap and a second re-transmission sent. After a number of iterations, five in the depicted embodiments, the remaining errors are not likely to be responsive to repeated correction cycles, and attempting such continued re-transmission would be wasteful. Accordingly, the process stops.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An error status report data structure for reporting errors in transmission of content data files comprised of multiple packets, said error status report data structure comprising:
    a file signature, said file signature corresponding to a content data file;
    a first of a range identifier, said first of a range identifier corresponding to a first missing block of the content data file in a range of missing blocks;
    a last of a range identifier, said last of a range identifier corresponding to a last missing block of a content data file in the range of missing blocks;
    said first of range identifier and said last of range identifier being associated with each other in said error status report data structure;
    a byte offset, said byte offset corresponding to a byte containing a missing block;
    a length indicator, said length indicator corresponding to a length of a plurality of missing blocks;
    a plurality of markings, said markings corresponding to a plurality of missing blocks;
    said byte offset, said length indicator and said plurality of markings being associated with each other in said error status report data structure;
    said association of said first of a range identifier and said last of a range identifier being used for a first number of marks corresponding to missing blocks and said association of said byte offset, said length indicator and said plurality of markings corresponding to a second number of marks corresponding to missing blocks; and
    wherein a data structure is configured in a computer readable medium.

2. The data structure of claim 1 wherein said first number of marks is one byte or more.

3. The data structure of claim 1 wherein said first number of marks and said second number of marks are configurable.

4. The data structure of claim 1 wherein said markings are a bitmap.

5. The data structure of claim 1 wherein at least one said association of said first of a range identifier and said last of a range identifier, or said association of said byte offset, said length indicator and said plurality of markings, is executed using a method selected from the group consisting of: Huffman coding, wavelet based compression, LZW, assigning symbols to groups of errors and run length encoding.

6. The data structure of claim 1 wherein said data structure includes an error report identifier, said error report identifier associating said data structure with an error report data structure configured in a remote uplink.

7. The data structure of claim 1 further comprising a single missing block indicator.

8. The data structure of claim 1 wherein said missing blocks include invalid packets.

9. The data structure of claim 1 wherein said missing blocks include content data packets never received.

10. The data structure of claim 1 wherein said missing blocks include data packets received but containing errors.

11. The data structure of claim 1 wherein said data structure comprises a memory.

12. The data structure of claim 1 wherein said data structure comprises a non-volatile memory.

13. An integrated receiver/decoder for receiving transmissions of content data files, said receiver/decoder comprising:
    a long term memory configured to store valid packets received, the valid packets comprising at least a part of a transmitted content data file;
    a short term memory configured to store identifiers for invalid packets;
    a data packet file receipt processor, said file receipt processor being configured to store valid packets received in said long term memory and to identify invalid packets in said short term memory;
    an error report processor, said error report processor being configured to be able to compress said short term memory both by identifying a consecutive range of invalid packets and by reproducing a plurality of markings, said plurality of markings corresponding to a consecutive plurality of invalid packets, said plurality of markings being located in a content data transmission with a byte offset and a length indicator
    a return path processor, said return path processor being configure to encapsulate said short term memory in an email, said email being adapted for transmission through a computer network to a remote uplink from which said content data files have been received.

14. The apparatus of claim 13 wherein said content data files are MPEG files.

15. The apparatus of claim 13 wherein said consecutive range is of a configurable length.

16. The apparatus of claim 13 wherein said plurality of markings is of a configurable length.

17. The apparatus of claim 13 wherein said compression of said short term memory is a bitmap.

18. The apparatus of claim 13 wherein said compression of said short term memory is executed using a method selected from the group consisting of: Huffman coding, wavelet based compression, LZW, assigning symbols to groups of errors and run length encoding.

19. The apparatus of claim 13 wherein said error report processor is further configured to include a single invalid packet indicator in said compression of said short term memory.

20. The apparatus of claim 13 wherein the invalid packets include content data packets never received.

21. The apparatus of claim 13 wherein the invalid packets include packets received but containing errors.

22. The apparatus of claim 13 wherein said short term memory is a non-volatile memory.

* * * * *